Feb. 26, 1935.                    W. A. GARRATT                    1,992,527
                               OVERRUNNING CLUTCH
                         Filed May 6, 1931          2 Sheets-Sheet 1

Inventor
Walter A. Garratt
By Murray and Zugelter
Attorneys

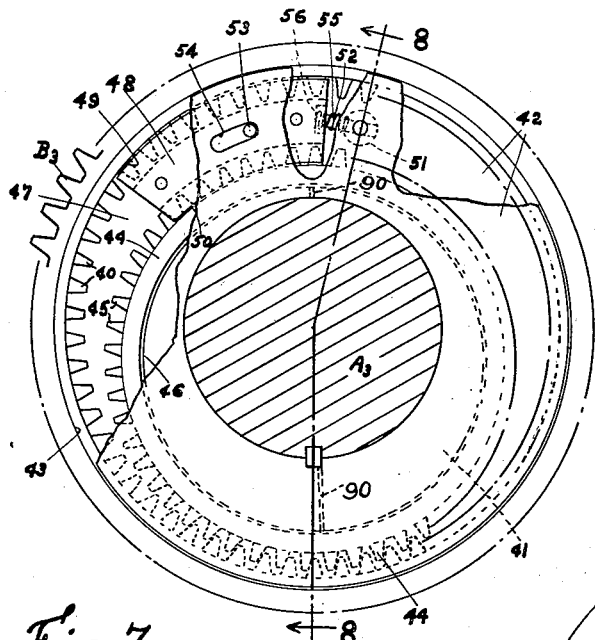
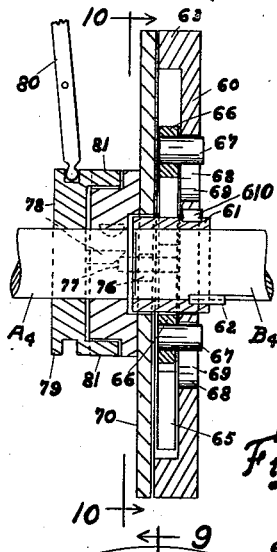
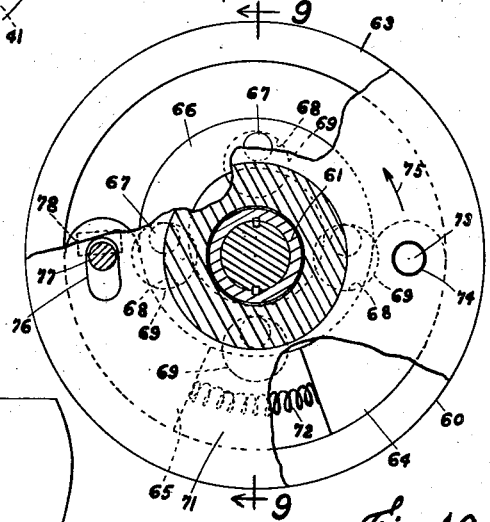
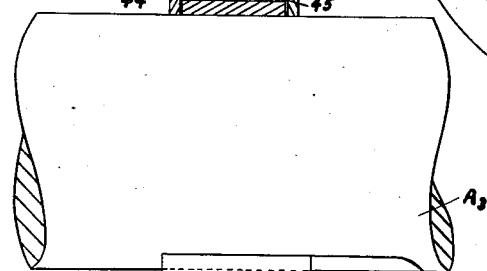
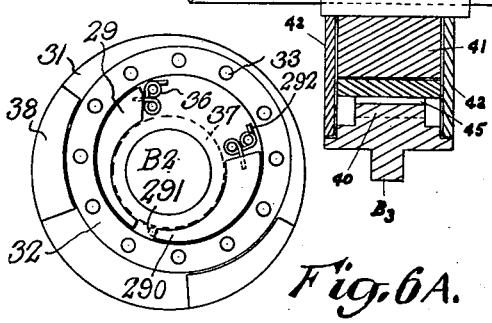
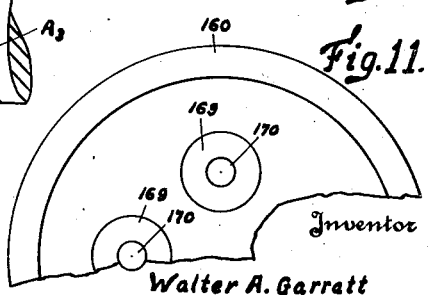

Patented Feb. 26, 1935

1,992,527

UNITED STATES PATENT OFFICE 1,992,527

OVERRUNNING CLUTCH

Walter A. Garratt, Covington, Ky.

Application May 6, 1931, Serial No. 535,451

12 Claims. (Cl. 192—41)

This invention relates to a device commonly known as an overrunning clutch, and has for an object the provision of a simplified device for transmitting rotary motion from a drive means or shaft to an aligned driven means or shaft only at such times as the drive shaft tends to rotate faster than the driven shaft.

Another object is to provide the overrunning clutch of this invention with means whereby the clutch may selectively be locked or rendered capable of direct drive power transmission regardless of any tendency of the drive and driven shafts to rotate relatively.

Another object is the provision of a device of the above character, that is highly efficient and requires but little space in a direction longitudinally of the drive and driven shafts.

Another object is the distribution of the power transmitting forces in the device in such a manner as to decrease wear on the parts and to obviate the setting up of excessive radial strains which burst the ordinary ball or roller type of overrunning clutch.

Still another object is to reduce the process of manufacture of the parts as much as possible to the stamping or punching art, thereby minimizing the amount of machining.

These and other objects are attained by the means described herein and disclosed in the accompanying drawings, in which:

Fig. 6A is a view similar to Fig. 4, with certain parts removed, and showing a simple means whereby the device may be selectively locked in a direct drive condition.

Fig. 7 is an elevational view of a third form of the device, parts being broken away.

Fig. 8 is a cross-sectional view taken on line 8—8 of Fig. 7.

Fig. 9 is a vertical cross-sectional view of a simplified form of the device and taken on line 9—9 of Fig. 10, part being broken away.

Fig. 10 is a cross-sectional view taken on line 10—10 of Fig. 9, part being broken away.

Fig. 11 is a fragmental plan view of a modified form of driven disc or element shown at 60 in Figs. 9 and 10.

Before proceeding with a detailed description of the device of this invention, it will be helpful to a proper understanding thereof to first point out some of the features which differentiate it from the common well-known and accepted form of overrunning clutch comprising rollers or ball bearings which act as wedges for effecting a driving relationship between drive and driven members. At the present time, the ball or roller type of overrunning clutch is being used to some extent in the propulsion of vehicles, which means that such clutches are now, if never before, called upon to carry great loads under very unfavorable conditions of severe and constant jerking and jarring. Each jerk or jar causes the balls or rollers to ascend inclined surfaces in the clutch until they become wedged between said inclined surfaces and an annular hardened steel flange which encloses the balls or rollers and also the member having the inclined surfaces. The last referred to member is usually in the form of a star wheel mounted concentrically with the annular hardened steel continuous flange. One point to be noted now, is that the balls or rollers, due to the fact that they are carried around by drive and driven members which are concentric to one another, may at times slip on one or the other of the members. In other words, the establishing of a driving relationship is accompanied by a certain amount of slippage, until the balls or rollers are so completely wedged that they can no longer slip, at which time they exert an enormous outward pressure upon the hardened encircling flange which, unless it is very heavy, will burst under the strain. The chief objections to the foregoing type of clutch are, the tendency to slip, the great bursting strain, and the "digging in" tendency of balls or rollers, which causes considerable wear and quite noticeably affects the smoothness of operation of the clutch. The foregoing objections are obviated in the radically different overrunning clutch of the present invention. It is pointed out in particular, that the clutch of this invention, instead of employing concentric cooperative drive and driven members, such as the star wheel and encircling flange of the old type of device, employs a circular wedge ring shown at 13 in Figs. 1, 2 and 3, which is never concentric with either the drive or driven members, and which ring engages with an abutment which may be of any form but which preferably and as shown has a surface eccentric to the axes of the drive and driven members but concentric with the axis of the wedge ring thus providing a surface to take the pressure of the drive. The new principle of operation characterizing the device will become clearer as the description proceeds.

Figure 1:
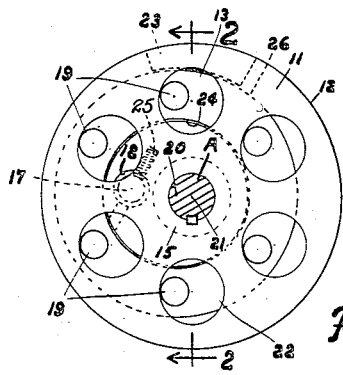
Fig. 1 is an elevational view of one form of the device.
Figure 2:
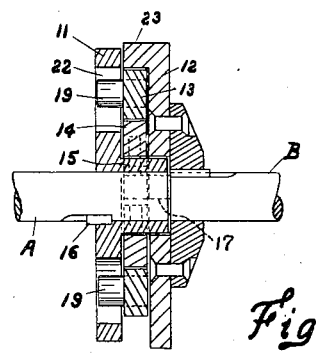
Fig. 2 is a cross sectional view taken on line 2—2 of Fig. 1.
Figure 3:
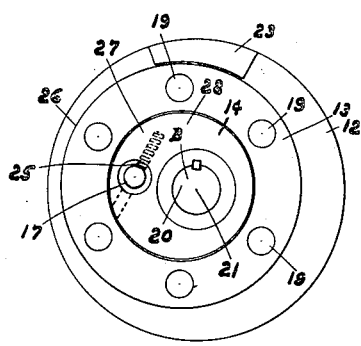
Fig. 3 is a view similar to Fig. 1, with certain parts removed.

One form of the device of the invention, as shown in Figs. 1, 2 and 3, comprises a driving member 11, which may be in the form of a disc secured to a drive shaft A, a driven member or disc 12 secured to a driven shaft B, a studded wedge ring 13, and a movable wedge member which may be in the form of an eccentric ring 14. There is an aperture 18 in the ring 14 entered by a pin 17 carried by the member 12. The aperture 18 is larger than the pin 17. At right angles to the pin 17 there is a recess in the eccentric wedge member 14 in which a spring 25 is mounted in compression against the pin 17 tending to rotate the eccentric 14 in the direction of the drive. The disc 11 may be concentrically mounted on and fixed to shaft A by means of a hub 15 and a key 16, said disc having a plurality of perforations 22 therein the centers of the perforations being disposed in a circle concentric with the axes 21 of the aligned shafts A and B. The eccentric ring 14 may abut, and is rotatable relative to, the hub 15 said ring being located, preferably, between the discs 11 and 12. The studded wedge ring 13 surrounds the ring 14 and is free to rotate thereabout, but always eccentrically to the shafts A and B. It should be noted that while the wedge member 14 is free to rotate relative to hub 15, the movement of said member relative to disc 12 is limited by the pin 17 fixed on the disc 12 and extending through the enlarged perforation or opening 18 in ring 14. The enlarged perforation permits slight relative movement between disc 12 and ring 14, the purpose of which will be explained hereinafter.

The studs or abutments 19 carried by the wedge ring 13 are disposed within the openings or perforations 22, and are arranged in a circle concentric with the center 20 of said ring but eccentric to the center 21 of the shafts. The walls of the perforations 22 are readily seen to provide abutments or surfaces adapted to cooperate with the abutments or studs 19 on ring 13, whereby rotation of the driving member 11 is imparted to the wedge ring 13. Other forms of cooperative abutments for imparting rotation of the driving member to the wedge ring will suggest themselves after an understanding of the invention. While rotating about the eccentric 14, the studded ring is guided in its fixed path of movement by the flange or abutment 23, which latter is fixed relative to the driven member or disc 12 and is adapted to abut the outer edge or periphery 26 of the wedge ring. The inner annular edge 24 of the wedge ring is adapted to contact the wedge member 14. The abutment 23 preferably has an inner curvature corresponding to the curvature of the ring periphery, which normally rides on the abutment.

The spring 25 or other suitable yielding means is not necessary for the operation of the device. If the parts are well fitted the absence of the spring can scarcely be noted since all of the space within the ring 13 outside of the hub 15 is filled by the eccentric 14 and therefore the wedge is always in position to bind. Even if there is a very loose fit, the contact between the hub 15 and the eccentric and between ring and eccentric is enough to move the eccentric into binding position. There is, however, in this condition of loose fitting, some lost motion or back lash in the operation of the device. This lost motion or back lash is eliminated by the spring 25.

Each of the openings or perforations 22 have a radius equal to the radius of the particular stud 19 engaged therein plus the distance between the axis of rotation of the eccentric and the true center of the eccentric. Through this arrangement, the driving member causes the eccentric ring 14 to bind the ring 13 against the abutment 23 by virtue of the engagement of the inner peripheries of the apertures with the studs.

To explain the functions of the parts when it is desired to transmit rotary motion from drive shaft A to driven shaft B, it will be assumed that shaft B tends to remain stationary while shaft A is rotated clockwise relative to B, (Figs. 2 and 3). Driving member 11 rotates clockwise, with the shaft A, and by reason of the connection effected by the means 19—22 the wedge ring 13 is rotated therewith, but about a different axis of rotation. By referring to Figure 3, it will be clearly apparent that the compression spring 25, by abutting the pin 17 and the eccentric ring 14 in the manner illustrated, tends always to urge the wedge portion 27 of the eccentric ring toward the abutment 23 for constricting the space therebetween, which space is occupied by the wedge ring 13. Consequently, upon clockwise rotation of the wedge ring 13, both the wedge ring and the wedge portion 27 of the eccentric ring are crowded into the space between the abutment 23 and the sleeve 15, thereby effecting a binding sufficient to establish transmission of power from shaft A to shaft B.

The eccentricity of the ring 13 relative to the axis of the driving and driven members is less than its radius. As has been stated, this ring is connected to the member 12 through the studs engaged within the apertures 22. Therefore, the ring will either revolve on its true center or can revolve on the axis of the driving and driven members when the connected member rotates.

It should be noted particularly that the binding of ring 13 against the eccentric 14 is not due to a force in an approximate direction parallel or along the face of the eccentric 14 but because of the constraint of the walls of the apertures 22 upon the pins 19 of the ring 13, the only direction in which ring 13 can move in relation to driving member 11 to avoid imparting movement to the abutment 23 on driven disc 12 is approximately at right angles to the face of the eccentric 14. The efficiency of this device is due, therefore, to the fact that the only movement of the ring 13 by which it can avoid imparting rotation from the driving member 11 to the driven member 12 is across the eccentric. The eccentric can retire from its position only by moving in a path approximately at right angles to the attempted movement of the ring 13, which attempted movement gives the only force acting upon the eccentric 14 except friction and compression of the spring, which forces tend to keep it from retiring.

The overrunning feature of the clutch may be demonstrated by rotating the wedge ring 13 and its associated shaft A in the reverse or counterclockwise direction of rotation, in which case the binding tendency of the spring urged wedging portion 27 is overcome by reason of the reversed movement of the wedge ring 13 which, with slight frictional contact, abuts the eccentric ring 14. The spring 25 is thereby rendered ineffective for urging the eccentric ring into binding position, as said ring is yieldingly urged in the opposite direction of rotation by reason of its frictional contact with the moving wedge ring 13. It should be clear from the foregoing that the eccentric ring 14 has but slight movement relative to the pin 17 and the driven member 12 which supports the pin.

Figure 4:
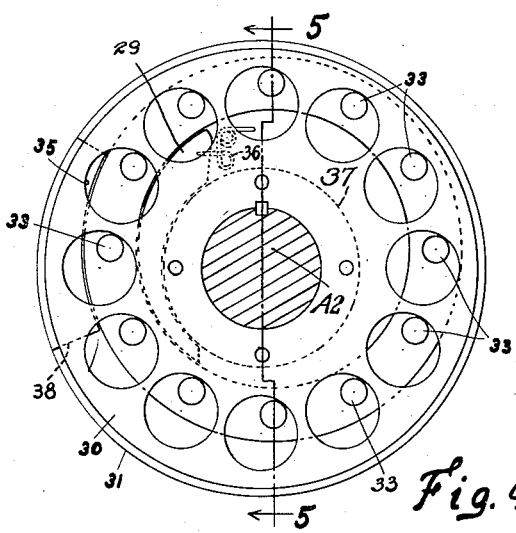
Fig. 4 is an elevational view of a second form of the device.
Figure 5:
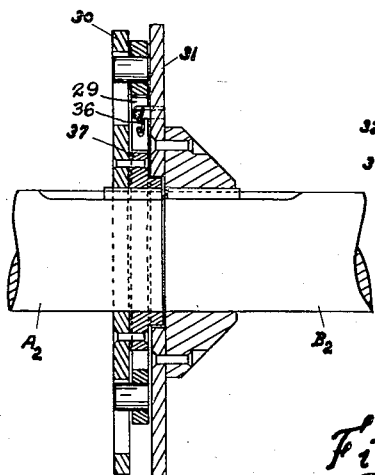
Fig. 5 is a cross sectional view taken on line 5—5 of Fig. 4.
Figure 6:
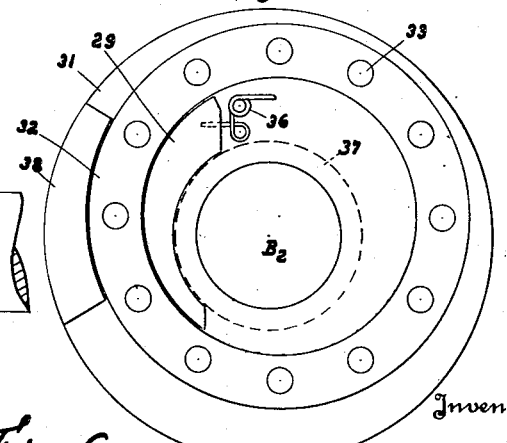
Fig. 6 is a view similar to Fig. 4 with parts A2 and 30 removed.

The form of the device of this invention shown in Figs. 4, 5, and 6 is substantially the same as that shown in Figs. 1, 2, and 3, except that the shiftable wedge member in this case is a segment of an eccentric ring, as indicated at 29.

The wedging function of the member 29 is the same as that of ring 14 in the former case, i. e., upon attempted rotation of the perforate driving disc 30 by shaft A2 in a direction counter-clockwise to the disc or driven member 31, the wedge member 29 under the influence of the spring 36 becomes wedged between the sleeve or shoulder 37 and the wedge ring 32, which latter is thereby forced against the abutment 38 on member 31. As a result of the wedging action, the drive and driven members are locked together for rotation as a unit. The sleeve or shoulder 37 may be a part of the member 30 and it is always in close proximity with the wedge member 29. Should shaft A2 be rotated clockwise instead of counterclockwise to shaft B2, the wedge 29 would be released, thereby permitting shaft A2 to rotate without turning shaft B2, as in the first described form of the device.

The device of Fig. 6 may be provided, as illustrated in Fig. 6A, with a second wedge member 290 manually controllable by means of a mechanism disposed exteriorly of the clutch, as shown in detail in Fig. 9, but which will be described more appropriately in connection with the explanation of Fig. 9. The added wedge member renders the overrunning feature of the clutch inoperative at the will of the operator.

Figs. 7 and 8 illustrate a form of the device of the invention, in which is employed an eccentrically disposed ring gear for effecting the transmission of rotary motion from a drive shaft A3 to a ring-shaped driven member which may have any suitable power transmission means associated therewith, such as external gear teeth B3. The driven member includes internal gear teeth 40 extending entirely around the inner face of the ring-shaped driven member. To the drive shaft A3 may be keyed, or otherwise fixed, an eccentric 41 and a pair of driving elements which may be concentrically mounted plates or discs 42. The elements 42 preferably are circular and are adapted to have their peripheries slidably received in annular guides or ways 43 formed on the ring-shaped driven member B3. Surrounding the eccentric 41 is an externally toothed ring gear 44 the teeth 45 of which engage the teeth 40 of member B3, as B3 and 44 are moved relatively. Because of its eccentric mounting, the gear 44 can never become concentric with the members A3 and B3. The ring gear 44 has a sliding or bearing fit on the eccentric at 46.

The ring gear 44, being eccentric to the driven member B3, provides a wedge space 47 which is occupied by a movable wedge-shaped member 48 having limited movement in said space. The wedge member may be designed to ride upon suitable smooth annular guides 49 and 50 on the members B3 and 44, respectively. It should be clear from the foregoing partial description, that counterclockwise rotation of the shaft A3 will effect a rolling of the ring gear 44 to the right, thereby increasing the wedge receiving space 47.

The wedge 48 is progressively advanced into the space 47, as the shaft A3 continues its rotation, by the following means.

At a location on one of the circular drive discs 42 adjacent to the wedge member 48, is secured an abutment or transverse drive block 51 which may connect the two discs 42 as illustrated. A yielding means such as a compression spring 52 abuts and separates the drive block and the wedge member, and said spring serves to always yieldingly urge the wedge into the wedge space 47 as the drive block, the drive discs 42, and the wedge member 48 rotate as a unit with the drive shaft A3, in a counterclockwise direction of rotation. While the device is in operation as above explained, the wedge member is yieldingly held in slight frictional sliding contact upon the guides 49 and 50 of the elements B3 and 44, and it is progressively advanced into the space 47 as the space changes its position relative to the peripheries of the members B3 and 44. However, when the direction of rotation of the drive shaft is reversed (clockwise), the space 47 tends to become restricted due to movement of the gear 44 to the left, and immediately the wedge member 48 becomes tightly wedged between the members B3 and 44. The driving relation thereby is established between members A3 and B3. The pin and elongated slot arrangement indicated at 53 and 54 provides a means for limiting the slight movement of the wedge member relative to the driving block 51. The driving block may be provided with an extending pin or guide 55 for maintaining the spring 52 in proper position. One end of the spring may have a seat 56 in the wedge member for further holding the spring in position, but the spring need not be attached thereto or to the driving block 51.

In order to facilitate assembly and to provide greater flexibility in the device, the eccentric 41 may be made in two substantially similar halves, as indicated by the lines 90—90 of Fig. 7. This however does not materially affect the principle of operation of the device.

In the simple modified form of the device illustrated in Figs. 9 and 10, there is disclosed a control means operable manually or otherwise, exteriorly of the device, for rendering the device usable as an overrunning clutch or as a direct drive, as desired. A4 represents the drive means and B4 the driven means. The driven disc or element 60 may be provided with a fixed hub or sleeve 61, keyed or otherwise secured thereto as at 610 to which the driven shaft B4 is keyed or otherwise secured, as at 62. An annular flange 63 on the driven disc provides an abutment for a pair of wedge shaped members 64 and 65 which cooperate with a wedge ring 66 as in the other forms of the device. The wedge ring carries fixed driving abutments or studs 67 for cooperation with fixed abutments 68 on the driven disc; the latter abutments may consist of the walls of perforations 69 in the driven disc, but it is to be understood that other forms of cooperative abutments may be utilized for restricting movement of the wedge ring and for effecting the driving connection therethrough. As in the device of Figs. 1 and 4, the perforations 69 are arranged with their centers equidistant from the axis of the drive and driven shafts, and the wedge ring is held in an eccentric position by means of the abuting wedge means. The wedge ring is adapted to abut the sleeve 61, or, if there is provided no sleeve such as 61, it may directly abut the shaft B4.

The drive element or disc 70 is keyed to the drive shaft A4 and is disposed concentrically to the driven disc 63. Said disc 70 provides a cover for the wedge ring and wedges, and it may rotate relative to the driven disc, as it is not secured thereto.

The wedge shaped members 64 and 65 occupy the largest space 71 provided by reason of the eccentricity of the wedge ring, and said members preferably are similar in shape and size, though not necessarily so. Each has an arcuate edge corresponding in curvature to the surfaces of the driven disc and the wedge ring, with which they are normally in contacting relationship. Any yielding means such as a weak compression spring 72 may be provided for normally urging the wedges apart and toward the wedging position. With the wedges urged to their extreme separated positions, it will be found that the device of Figs. 9 and 10 is locked so as to provide for a direct power drive in either direction of rotation of the drive or driven shafts. However, by disposing and maintaining the wedges in a relatively closer relationship, while the device is in operation, the clutch will operate to drive in only one direction of rotation. Any suitable and practical means may be provided for thus maintaining the wedges in slightly closer relationship, in opposition to the force of the weak spring 72. One form of means for the purpose is indicated in Figs. 9 and 10, and a description thereof follows.

In the modification under consideration, the drive block or stud 73, which is secured to the wedge 64, extends through a perforation 74 in the drive member 70 and thereby the said wedge is moved by the drive member in the direction indicated by the arrow 75. Obviously, if the other wedge 65 is permitted to remain in the wedging position shown in Fig. 10, the wedge ring will be precluded from movement to the left and, as a result, a direct drive will be effected between the drive and driven members. If, however, the wedge 65 is caused to progressively move from the wedging position while the wedge 64 is being advanced by the rotation of the drive member 70, no wedging will result and consequently the clutch will be overrunning. In order to progressively advance the wedge 65, there may be provided in the drive member 70 an elongated slot 76 through which extends a stud 77 which is fixed to the wedge member 65. By providing a manually reciprocable member 78 mounted to revolve with the stud 77 and to move the stud slightly for decreasing the distance between the wedges at 71, the progressive advancement of the wedge 65 may be effected for rendering the clutch overrunning as above described. This may be accomplished by providing the end of the reciprocable member 78 with an inclined face adapted to contact the stud 77 and to thereby move it laterally. The reciprocable member may be mounted on a clutch collar 79 which may be moved, by means of the pivoted lever 80, longitudinally of the shaft A4. The spline connection at 81 precludes relative rotation of the collar and the drive disc or plate 70. It is to be understood that the foregoing means for controlling the wedge 65 is exemplary of but one form of means for the purpose, and that any one of a number of known means suitable for control of the wedge may be employed.

After an understanding of the foregoing paragraph, it should be clearly apparent that the device of Fig. 6A may, like that of Fig. 10, be provided with a second wedge as indicated by the lines 290, which wedge may similarly be controlled by a manually reciprocable member 291. In the device of Fig. 6A the wedge 290 would be moved, by the means 291, in a direction opposing the spring 292 which normally functions to advance the wedge into wedging position. Therefore, by overcoming the function of the spring, the wedge 290 may be rendered inoperative and thereby the device is rendered capable of overrunning in one direction. If the wedge 290 is uncontrolled, both wedges act to preclude overruning of the clutch in both directions of rotation, and the device thereby becomes a rigid coupling for the drive and driven shafts.

Attention is directed to the fact that in all forms of the device illustrated herein, the circular wedge ring is always eccentric to the drive and driven members, which results in an initial clamping action in a direction across the device rather than in the general direction of rotation of the clutch. The establishing of a driving relation thereby is unattended by slippage or even a tendency to slip, and consequently scoring and wearing of the parts is practically eliminated.

In Fig. 11 is shown a fragmental plan view of a disc or plate member 160 corresponding to member 60 of Fig. 10, in which the perforations 69 of Fig. 10 are replaced by depressions 169 having disposed centrally thereof cylindrical studs 170. With the use of a driven member such as that indicated at 160, the studs on the wedge ring would ride in the depressions 169 and the path of movement of the wedge ring would thereby be determined by the cylindrical studs 170.

Because of the non-shifting nature of the wedge ring and other moving parts of the device of this invention, counter-balancing of the parts is simply accomplished by attachment of a suitable weight, (not shown) diametrically opposite the actual center of gravity of the device.

It is to be understood that various modifications and changes in structural details of the device may be made, within the scope of the appended claims, without departing from the spirit of the invention.

What is claimed is:

1. A power transmission device comprising in combination a drive element and a driven element, a wedge ring, means associated with the wedge ring and one of the elements for rotating the wedge ring with said element upon rotation of the drive and driven elements relatively, the wedge ring being rotated about an axis removed from the axis of the driven element, a pair of abutments providing a limited space in which the wedge ring moves, and a shiftable wedge member frictionally engaging the movable wedge ring and constantly urged toward a wedging position within the space, the shiftable wedge member being precluded from complete entry into said space by reason of its frictional contact with the wedge ring only while said ring is rotating relative thereto in one direction of rotation, the wedge member being at other times free to enter the limited space for constricting the space and establishing a driving connection between the drive and driven members by wedging the wedge ring between the pair of abutments.

2. A power transmission device comprising in combination a drive element and a driven element, a wedge ring, means associated with the wedge ring and one of the elements for rotating the wedge ring with said element upon rotation of the drive and driven elements relatively, the wedge ring being rotated about an axis removed from the axis of the driven element, a pair of abutments providing a limited space in which the wedge ring moves, a shiftable wedge member frictionally engaging the movable wedge ring and constantly urged toward a wedging position within the space, the shiftable wedge member being precluded from complete entry into said space by reason of its frictional contact with the wedge ring only while said ring is rotating relative thereto in one direction of rotation, the wedge member being at other times free to enter the limited space for constricting the space and establishing a driving connection between the drive and driven members by wedging the wedge ring between the pair of abutments, and means for independently controlling shifting of the wedge member.

3. A controllable overrunning clutch comprising in combination a drive element and a driven element, a wedge ring, means associated with the wedge ring and one of the elements, for rotating the wedge ring with said element upon rotation of the drive and driven elements relatively, the wedge ring being rotated about an axis removed from the axis of the driven element, two pairs of abutments providing two limited spaces in which the wedge ring moves, two shiftable wedge members each associated with and normally urged toward one of the said limited spaces whereby to wedge the ring member between the pairs of abutments upon relative rotational movement of the drive and driven members, one or the other of said wedge members being acted upon during attempted relative rotation of the drive and driven elements to preclude such entry thereof into its cooperative limited space as would constrict the space to wedge the wedge ring, and means for independent control of the shifting movement of one of the wedge members.

4. In a power transmission device the combination with a drive member and a driven member mounted for rotation about a common axis, of an intermediate true ring-shaped member of uniform width having an eccentric mounting on one of said two first mentioned members and means insertable between the eccentrically mounted member and the second of said two first mentioned members for effecting a driving connection between said members when the rate of rotation of the driven does not exceed the rate of rotation of the drive member said insertable means being ineffective for attaining a driving connection between said members when the rate of rotation of the driven member tends to exceed the rate of rotation of the drive member.

5. In a drive coupling device, driving and driven members disposed on the same axis, a wedge member mounted on one of said first mentioned members, a second wedge member, adjacent circular surfaces of said wedge members disposed on the same axis eccentric to the axis of the driving and driven members, a ring disposed on the axis of the adjacent circular surfaces of the wedge members and having a portion passing between the wedge members, one of said wedge members disposed along a portion of the ring only, said ring mounted in driving connection at all times with one of said members, and one of said wedge members loosely mounted for movement on the axis of the member on which it is mounted.

6. In a drive coupling device, a driving element, a driven element, said elements disposed on the same axis, a loosely mounted eccentric inner wedge element, an outer wedge element mounted on one of said first mentioned elements, adjacent curved surfaces of said wedge elements disposed on the axis of the eccentric wedge, a ring in rotative connection with the other of said first mentioned elements but disposed on the same axis as the eccentric wedge, said outer wedge member of short circular dimension so as to engage with a portion of the ring only, said eccentric wedge freely movable for swinging movement toward and from the ring.

7. In a drive coupling device, driving and driven elements, said elements disposed on the same axis, a loosely mounted eccentric inner wedge element, an outer wedge element carried by one of said first mentioned elements, the adjacent circular surfaces of said wedge elements disposed on the axis of the eccentric wedge element, a ring having a multiplicity of studs extended from the side thereof, the other of said first mentioned elements having apertures of greater diameter than the pins, one for each pin, said pins engaging the inner periphery of the circular openings at all times, whereby said ring is in driving connection with said apertured element, said ring disposed on the same axis as the eccentric wedge, and said eccentric wedge freely movable for swinging movement toward and from the ring.

8. In a drive coupling device, driving and driven members disposed on the same axis, an abutment mounted on one of said first mentioned members, a swinging element disposed on an axis eccentric to the axis of the other of said first mentioned members, a ring mounted about and guided by the swinging element, the outer periphery of the ring adapted to engage said abutment when the swinging element revolves on the axis of the shaft and against the ring, said abutment located only at one side of the axis of the members, said ring mounted in driving connection at all times with one of said members, and said swinging element having a limited swinging movement on the axis of the member on which it is mounted.

9. In a drive coupling device, driving and driven plates disposed for rotation on the same axis, an eccentric mounted between said plates and loosely rotative on an axis eccentric to the axis of the plates, an abutment fixed on one of said plates and limiting swinging movement of the eccentric, a ring disposed about said eccentric having an inner bore fitting snugly about the eccentric, an abutment formed on said last mentioned plate at one side of the axis of said plate and adapted to be engaged by the ring, said abutment located substantially at right angles to a line drawn between the axis of rotation of the eccentric and the true center of the eccentric, a series of studs extended from one face of the ring, the other of said first mentioned plates having a series of circumferentially arranged apertures therein, each aperture entered by a respective stud of the ring, said apertures having a radius equal to the radius of the stud plus the distance between the axis of rotation of the eccentric and the true center of the eccentric, whereby the driving member causes the eccentric to bind the ring against the second abutment through the engagement of the inner peripheries of the apertures with the studs.

10. In a drive coupling device, driving and driven members disposed on the same axis, an abutment mounted on one of said first mentioned members, an eccentric disposed on an axis eccentric to the axis of the other of said first mentioned members, a ring mounted about and guided by the eccentric, the outer periphery of the ring adapted to engage said abutment when the eccentric revolves on the axis of the shaft and against the ring, said abutment located only at one side of the axis of the members, said ring mounted in driving connection at all times with one of said members.

11. In a drive coupling device, driving and driven members mounted for rotation on the same axis, a ring for imparting drive between the driving and driven members, mounted eccentric to said axis, its eccetricity being less than its radius, said ring being connected to one of said first mentioned members so as to permit the ring to revolve either on its true center or on the axis of the driving and driven members when the said connected member rotates, an abutment on that one of the first mentioned members other than the one connected to the ring, said abutment disposed on one side only of said axis of the driving and driven members, which abutment is engaged in driving relation by the ring when the ring rotates with its connected member on the axis of the driving and driven members and not engaged in driving relation when it rotates with its connected member but on its own true center, a swinging wedge member disposed freely rotatably on the axis of the driving and driven members, a connection between the swinging wedge member and that one of the first mentioned members having the mentioned abutment for limiting the swinging movement of the wedge member, this last mentioned connection, when the drive is in one direction, causing the wedge member to prevent rotation of the ring on its own center, the ring thereby engaging the abutment in driving relation, and when the direction of drive is in the opposite direction causing the wedge member to allow the ring to rotate on its own center, the ring thereby failing to engage the abutment in driving relation.

12. In a drive coupling device, driving and driven members disposed on the same axis, an abutment mounted on one of the said first mentioned members, a swinging element disposed on an axis eccentric to the axis of said driving and driven members, a ring mounted in position whereby a portion thereof is disposed between said abutment and said swinging element, said ring adapted to engage said abutment when the swinging element rotates on the axis of the driving and driven members against the ring, said abutment located only at one side of the axis of the members, said ring mounted in driving connection at all times with that member not carrying the abutment, and means for limiting the swinging movement of said swinging element.

WALTER A. GARRATT.